(12) United States Patent
Kitamura et al.

(10) Patent No.: US 9,772,444 B2
(45) Date of Patent: Sep. 26, 2017

(54) OPTICAL FIBER

(71) Applicant: Fujikura Ltd., Tokyo (JP)

(72) Inventors: Takayuki Kitamura, Sakura (JP); Sho Endo, Sakura (JP); Tatsuya Kishi, Sakura (JP); Ryo Maruyama, Sakura (JP)

(73) Assignee: FUJIKURA LTD., Tokyo (JP)

(*) Notice: Subject to any disclaimer, the term of this patent is extended or adjusted under 35 U.S.C. 154(b) by 0 days.

(21) Appl. No.: 15/467,264

(22) Filed: Mar. 23, 2017

(65) Prior Publication Data

US 2017/0192169 A1  Jul. 6, 2017

Related U.S. Application Data

(63) Continuation of application No. PCT/JP2015/077080, filed on Sep. 25, 2015.

(30) Foreign Application Priority Data

Sep. 26, 2014 (JP) .................. 2014-195937
Sep. 26, 2014 (JP) .................. 2014-195938

(51) Int. Cl.
*G02B 6/02* (2006.01)
*G02B 6/036* (2006.01)

(52) U.S. Cl.
CPC ..... *G02B 6/03627* (2013.01); *G02B 6/02004* (2013.01); *G02B 6/0365* (2013.01)

(58) Field of Classification Search
CPC .............. G02B 6/0285; G02B 6/02955; G02B 6/03616; G02B 6/0281; G02B 6/03627; G02B 6/30633; G02B 6/0365
See application file for complete search history.

(56) References Cited

U.S. PATENT DOCUMENTS 5,504,829 A   4/1996  Evans et al.
6,386,001 B1  5/2002  Shimizu et al.
(Continued)

FOREIGN PATENT DOCUMENTS

EP   0 260 795 A2   3/1988
EP   1 397 718 B1   10/2004
(Continued)

OTHER PUBLICATIONS

Extended (supplementary) European Search Report dated Mar. 21, 2017, issued in counterpart European Patent Application No. 15826791.4. (8 pages).
(Continued)

*Primary Examiner* — Sung Pak
*Assistant Examiner* — Hoang Tran
(74) *Attorney, Agent, or Firm* — Westerman, Hattori, Daniels & Adrian, LLP

(57) ABSTRACT

An optical fiber including a core and a cladding including an inner cladding layer and an outer cladding layer is provided. The refractive index of the core $\Delta 1$, the refractive index of the inner cladding layer $\Delta 2$, and the refractive index of the outer cladding layer $\Delta 3$ have a relationship denoted by the following expressions: $\Delta 1 max > \Delta 2 min$ and $\Delta 1 max > \Delta 3$, and $0.01\% < |\Delta 2 min - \Delta 3| < 0.03\%$. An outer circumference radius r1 of the core, an outer circumferential radius r2 of the inner cladding layer, and an outer circumferential radius r3 of the outer cladding layer have a relationship denoted by the following expressions: $r1 < r2 < r3$, and $0.2 \leq r1/r2 \leq 0.5$. A cable cut-off wavelength $\lambda cc$ 1260 nm or less. A mode field diameter at a wavelength of 1310 nm is 8.6 µm or more and 9.5 µm or less.

9 Claims, 5 Drawing Sheets

(56) References Cited

U.S. PATENT DOCUMENTS

| | | |
|---|---|---|
| 6,449,416 B1 | 9/2002 | Lee et al. |
| 6,882,788 B2 | 4/2005 | Van Bergen et al. |
| 6,999,667 B2 | 2/2006 | Jang et al. |
| 7,003,205 B2 | 2/2006 | Cho et al. |
| 7,154,663 B2 | 12/2006 | Lee et al. |
| 7,406,237 B2 | 7/2008 | Bickham et al. |
| 8,428,411 B2 | 4/2013 | de Montmorillon et al. |
| 8,588,569 B2 | 11/2013 | Bookbinder et al. |
| 2003/0063878 A1 | 4/2003 | Matsuo et al. |
| 2006/0045448 A1 | 3/2006 | Nakajima et al. |
| 2006/0093297 A1 | 5/2006 | Sako et al. |
| 2007/0147751 A1 | 6/2007 | Fini |
| 2013/0044987 A1 | 2/2013 | Bickham et al. |
| 2013/0094824 A1 | 4/2013 | Lee et al. |
| 2014/0328566 A1* | 11/2014 | Bickham ............ G02B 6/02395 385/128 |
| 2015/0226914 A1 | 8/2015 | Hirano et al. |

FOREIGN PATENT DOCUMENTS

| | | |
|---|---|---|
| EP | 1 777 559 A1 | 4/2007 |
| EP | 1 808 717 A1 | 7/2007 |
| JP | 63-43107 A | 2/1988 |
| JP | 7-209539 A | 8/1995 |
| JP | 2000-205999 A | 7/2000 |
| JP | 2000-264661 A | 9/2000 |
| JP | 2006-133496 A | 5/2006 |
| JP | 2006-293166 A | 10/2006 |
| JP | 2008-547049 A | 12/2008 |
| JP | 4268115 B2 | 5/2009 |
| JP | 2009-543126 A | 12/2009 |
| JP | 2010-501894 A | 1/2010 |
| JP | 4417286 B2 | 2/2010 |
| JP | 2012-516473 A | 7/2012 |
| JP | 2013-512463 A | 4/2013 |
| JP | 2013-88818 A | 5/2013 |
| JP | 2013-520711 A | 6/2013 |
| JP | 2014-67020 A | 4/2014 |
| WO | 2004/092793 A1 | 10/2004 |
| WO | 2005/106544 A1 | 11/2005 |
| WO | 2006/016572 A1 | 2/2006 |
| WO | 2006/049279 A1 | 5/2006 |
| WO | 2006/118362 A1 | 11/2006 |
| WO | 2007/053198 A2 | 5/2007 |
| WO | 2008/005233 A2 | 1/2008 |
| WO | 2008/024255 A2 | 2/2008 |
| WO | 2010/088482 A1 | 8/2010 |
| WO | 2011/066061 A2 | 6/2011 |
| WO | 2011/106293 A1 | 9/2011 |

OTHER PUBLICATIONS

Decision to Grant a Patent dated May 9, 2017, issued in counterpart Japanese Patent Application No. 2016-501467. (3 pages).
"Characteristics of a bending-loss insensitive single-mode optical fibre and cable for the access network", Telecommunication Standardization Sector of ITU, Oct. 2012, G.657, (24 pages).
Okamoto et al., "Computer-Aided Synthesis of the Optimum Refractive-Index Profile for a Multimode Fiber", IEEE Transactions on Microwave Theory and Techniques, Mar. 1977, vol. MTT-25, No. 3, pp. 213-221, (9 pages).
"Characteristics of a single-mode optical fibre and cable", Telecommunication Standardization Sector of ITU, Nov. 2009, G.652, (22 pages).
"Characteristic of a bending-loss single-mode optical fibre and cable for the access network", Telecommunication Standardization Sector of ITU, Oct. 2010, G.657, (24 pages).
JP Office Action dated Sep. 20, 2016, issued in Japanese Patent Application No. 2016-501467 in Japanese (4 pages).
Non-Final Office Action dated Nov. 23, 2016, issued in U.S. Appl. No. 15/083,957 (10 pages).
JP Office Action dated Feb. 28, 2017, issued in Japanese Patent Application No. 2016-509795 in Japanese (3 pages).
Office Action dated May 26, 2017, issued in Russian Application No. 2016109055, with English transaltion. (11 pages).

\* cited by examiner

OPTICAL FIBER

CROSS REFERENCE TO RELATED APPLICATIONS

This application is a continuation application based on a PCT Patent Application No. PCT/JP2015/077080, filed Sep. 25, 2015, whose priority is claimed on Japanese Patent Application No. 2014-195937 filed Sep. 26, 2014 and Japanese Patent Application No. 2014-195938 filed Sep. 26, 2014, the entire contents of which are hereby incorporated by reference.

BACKGROUND OF THE INVENTION

Field of the Invention

The present invention relates to an optical fiber.

Description of the Related Art

An optical fiber has been installed even on the inside of buildings, houses, or the like according to the spread of Fiber To The Home (FTTH). According to this, an optical fiber has attracted attention in which an excessive loss, so-called bending loss (a macro bend loss) which occurs at the time of imparting bending properties, is reduced.

By using an optical fiber having a low bending loss, prevention of instantaneous interruption of a signal due to the loss which occurs at the time of bending the optical fiber, a reduction in installation costs due to handling simplification, and the like have been expected.

ITU-T Recommendation G.657 is used as the standard of an optical fiber in which the bending loss is reduced compared to a standard single mode optical fiber (SSMF) while being based on ITU-T Recommendation G.652 which is the standard of the standard single mode optical fiber (SSMF).

For example, the following methods have been proposed as a method of improving the bending loss.

(1) Increasing Refractive Index of Core

By increasing the refractive index of the core, a mode field diameter (MFD) decreases compared to S-SMF, and thus, containment of light with respect to the core is improved. Therefore, the bending loss of the optical fiber can be reduced. In this case, in order to match dispersion to G.652, it is preferable that so-called depressed refractive index profile in which the refractive index of the cladding near the core is reduced be adopted (for example, refer to Published Japanese Translation No. 2013-520711 of the PCT International. Publication and K. Okamoto and T. Okoshi, "Computer-aided synthesis of the optimum refractive index profile for a multimode fiber," IEEE Trans. Microwave Theory Tech., vol. MTT-25, pp. 213-221, 1976). In addition, Published Japanese Translation No. 2013-520711 of the PCT International Publication shows that by adjusting the refractive index of an internal-layer cladding region, it is possible to maintain a balance between both of the characteristics, that is, the MFD and the bending loss.

A product corresponding to a bending radius up to 15 mm which is based on G.657.A1 is used as such a type of optical fiber.

(2) Adopting Refractive Index Profile having Trench-Shape

By adopting the trench-shape refractive index profile having a low refractive index portion at a location away from the core of the cladding, containment of the light with respect to the core can be improved and the bending loss can be reduced (for example, refer to Japanese Unexamined Patent Application, First Publication No. S63-43107).

A product corresponding to a bending radius up to 10 mm which is based on G.657.A2 or G.657.B2 and a product corresponding to a smaller bending radius up to 7.5 mm which is based on G.657.B3 are used as such a type of optical fiber. In addition, a product corresponding to a bending radius up to 7.5 mm which is based on G.657.B3 and of which other optical properties are based on the standard of G.657.A series are used as such a type of optical fiber.

(3) Forming Hole to Cladding

An optical fiber (for example, a hole-assisted fiber (HAF)) in which a hole along a longitudinal direction of the optical fiber is formed at a location away from the core of the cladding or an optical fiber in which a fine structure including a plurality of independent openings (for example, ClearCurve® manufactured by Corning Inc.) can improve containment of light with respect to the core. Therefore, the bending loss can be reduced (for example, refer to PCT International Publication No. WO2004/092793 and Published Japanese Translation No. 2009-543126 of the PCT International Publication).

A product corresponding to a bending radius up to 7.5 mm which is based on G.657.B3 is used as such a type of optical fiber.

In the above-described method, an optical fiber having a high refractive index of the core can have a lower bending loss. However, according to this, the mode field diameter decreases, and a connection loss with respect to SSMF increases. For this reason, there is a limit for reducing the bending loss.

In an optical fiber having a trench type refractive index profile, it is necessary to form the plurality of layers having a different refractive index, and thus, a manufacturing step of a preform becomes complicated.

In an optical fiber having a hole, a manufacturing step becomes complicated compared to an optical fiber having a solid structure. In addition, an advanced drawing technology is required, and thus, the manufacturing is not easily performed.

The present invention takes into consideration of the above circumstances and provides an optical fiber in which the bending loss can be reduced without increasing the connection loss and which is easy to manufacture.

SUMMARY OF THE INVENTION

It has been known that the refractive index of the cladding in a portion close to the core considerably affects optical properties of the optical fiber, but as a result of intensive studies of the present inventors, a refractive index profile which is able to reduce a bending loss without decreasing a mode field diameter has been found.

The present invention has been made based on the findings described above, and by adopting the above-described refractive index profile, the optical fiber has technical meaning from the viewpoint of making suppression of the connection loss at the time of being connected to the other optical fiber and a reduction in the bending loss compatible.

A first aspect of the present invention is an optical fiber including a core and a cladding formed on an outer periphery of the core. The cladding comprises at least an inner cladding layer adjacent to the core and an outer cladding layer formed on the outer circumference side of the inner cladding layer, a refractive index of the core is $\Delta 1$ and a maximum refractive index of the core is $\Delta 1 max$, a refractive index of the inner cladding layer is $\Delta 2$ and a minimum refractive index of the inner cladding layer is $\Delta 2 min$, and a refractive index of the outer cladding layer is $\Delta 3$. The refractive index of the core, the refractive index of the inner cladding layer, and the refractive index of the outer cladding layer have a relationship denoted by Expressions (1) and (2).

$$\Delta 1max > \Delta 2min \text{ and } \Delta 1max > \Delta 3 \tag{1}$$

$$0.01\% < |\Delta 2min - \Delta 3| < 0.03\% \tag{2}$$

An outer circumference radius r1 of the core, an outer circumferential radius r2 of the inner cladding layer, and an outer circumferential radius r3 of the outer cladding layer have a relationship denoted by Expressions (3) and (4).

$$r1 < r2 < r3 \tag{3}$$

$$0.2 \leq r1/r2 \leq 0.5 \tag{4}$$

A cable cut-off wavelength $\lambda cc$ satisfies Expression (5).

$$\lambda cc \leq 1260 \text{ nm} \tag{5}$$

A mode field diameter at a wavelength of 1310 nm satisfies Expression (6).

$$8.6 \text{ μm} \leq MFD \leq 9.5 \text{ μm} \tag{6}$$

A second aspect of the present invention is the optical fiber according to the first aspect, in which the refractive index of the core, the refractive index of the inner cladding layer, and the refractive index of the outer cladding layer have a relationship denoted by Expressions (1A) and (2A).

$$\Delta 1max > \Delta 3 > \Delta 2min \tag{1A}$$

$$0.01\% < (\Delta 3 - \Delta 2min) < 0.03\% \tag{2A}$$

A third aspect of the present invention is the optical fiber according to the second aspect, in which $\Delta 1max$ further satisfies $0.33\% \leq \Delta 1max \leq 0.40\%$.

A fourth aspect of the present invention is the optical fiber according to any one of the first to third aspects, in which a loss increase at a wavelength of 1550 nm at the time of winding the optical fiber around a mandrel having a diameter of 15 mm 10 times is less than or equal to 0.25 dB, and a loss increase at a wavelength of 1625 nm at the time of winding the optical fiber around the mandrel having the diameter of 15 mm 10 times be less than or equal to 1.0 dB.

A fifth aspect of the present invention is the optical fiber according to any one of the first to fourth aspects, in which the outer cladding layer is formed of pure silica glass, and the inner cladding layer is formed of silica glass to which fluorine is added.

A sixth aspect of the present invention is the optical fiber according to any one of the first to fifth aspects, in which the outer cladding layer is formed of pure silica glass, and the inner cladding layer is formed of silica glass to which chlorine is added.

In addition, when $\Delta 2 < \Delta 3$, the inner cladding layer is preferably formed of, for example, the silica glass to which fluorine is added fluorine (F) is added. When $\Delta 2 > \Delta 3$, the inner cladding layer is preferably formed of, for example, the silica glass to which fluorine is added chlorine (Cl) is added.

A seventh aspect of the present invention is the optical fiber including a core and a cladding formed on an outer periphery of the core. The cladding includes at least an inner cladding layer adjacent to the core, a trench portion adjacent to the outer circumference side of the inner cladding layer, and an outer cladding layer formed on the outer circumference side of the trench portion. A refractive index of the core is $\Delta 1$ and a maximum refractive index of the core is $\Delta 1max$, a refractive index of the inner cladding layer is $\Delta 2$ and a minimum refractive index of the inner cladding layer is $\Delta 2min$, a refractive index of the trench portion is $\Delta 3$ and a minimum refractive index of the inner cladding layer is $\Delta 3min$, and a refractive index of the outer cladding laser is $\Delta 4$. The refractive index of the core, the refractive index of the inner cladding layer, the refractive index of the trench portion, and the refractive index of the outer cladding layer have a relationship denoted by Expressions (11)-(13).

$$\Delta 1max > \Delta 2 > \Delta 3min \tag{11}$$

$$\Delta 1max > \Delta 4 > \Delta 3min \tag{12}$$

$$0.01\% < (\Delta 4 - \Delta 3min) < 0.03\% \tag{13}$$

An outer circumference radius r1 of the core, an outer circumferential radius r2 of the inner cladding layer, an outer circumferential radius r3 of the trench portion, and an outer circumferential radius r4 of the outer cladding layer have a relationship denoted by Expressions (14-16).

$$r1 \leq r2 < r3 < r4 \tag{14}$$

$$1 \leq r2/r1 \leq 5 \tag{15}$$

$$1 < r3/r2 \leq 2 \tag{16}$$

A cable cut-off wavelength $\lambda cc$ satisfies Expression (17).

$$\lambda cc \leq 1260 \text{ nm} \tag{17}$$

A mode field diameter at a wavelength of 1310 nm satisfies Expression (18).

$$8.6 \text{ μm} \leq MFD \leq 9.5 \text{ μm} \tag{18}$$

An eighth aspect of the present invention is the optical fiber according to seventh aspect, in which a loss increase at a wavelength of 1550 nm at the time of winding the optical fiber around a mandrel having a diameter of 15 mm 1.0 times is less than or equal to 0.25 dB, and a loss increase at a wavelength of 1625 nm at the time of winding the optical fiber around the mandrel having the diameter of 15 mm 10 times be less than or equal to 1.0 dB.

A ninth aspect of the present invention is the optical fiber according to seventh or eighth aspect, in which the outer cladding layer is formed of pure silica glass, and the trench portion is formed of silica glass to which fluorine is added.

According to the aspects of the present invention described above, by adjusting a reflective index difference between the inner cladding layer and the outer cladding laser and a ratio of an outer circumference radius of the core and an outer circumference radius of the inner cladding layer, the connection loss at the time of being connected to the other optical fiber (for example, a general single mode optical fiber (SSMF)) is able to be suppressed to be low, and the bending loss is able to be reduced.

According to the aspects of the present invention described above, by adjusting a reflective index difference between the trench portion and the outer cladding layer and a ratio of an outer circumference radius of the core, an outer circumference radius of the inner cladding layer, and an outer circumference radius of the trench portion, the connection loss at the time of being connected to the other optical fiber (for example, a general single mode optical fiber (SSMF)) is able to be suppressed to be low, and the bending loss is able to be reduced.

In addition, according to the aspects of the present invention described above, the manufacturing method of the related art is able to be used without being considerably

DETAILED DESCRIPTION OF THE PREFERRED EMBODIMENTS

Hereinafter, the present invention will be described on the basis of preferred embodiments and with reference to the drawings.

First Embodiment

Figure 1:
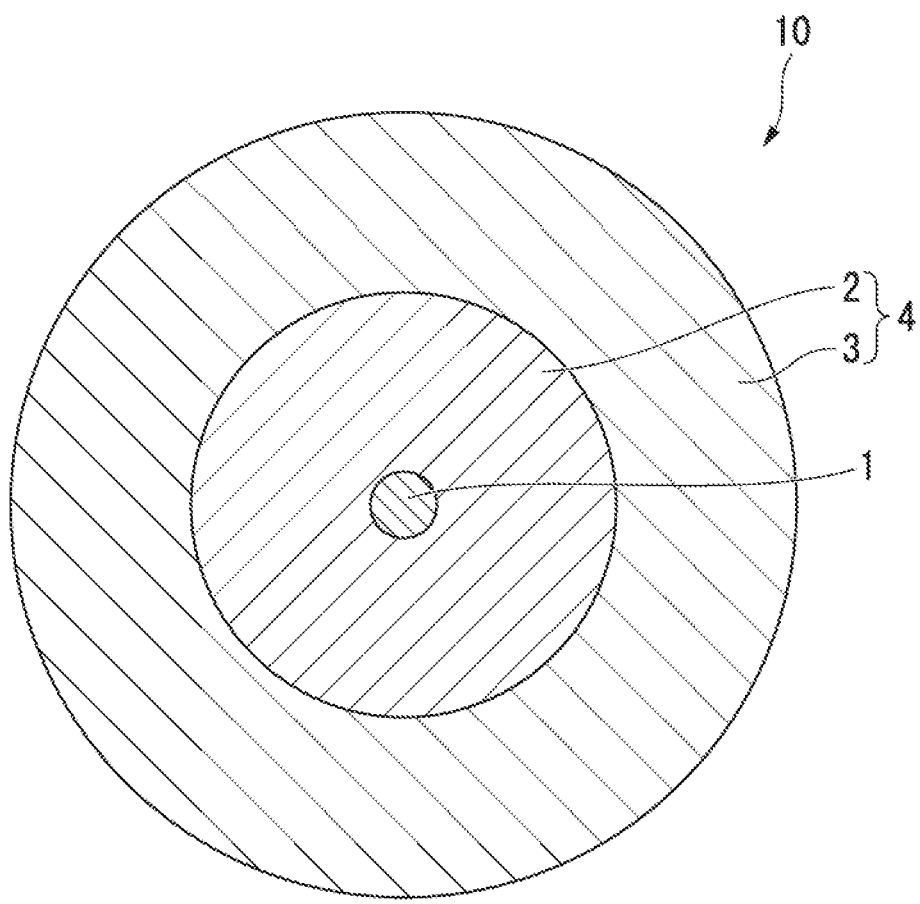
FIG. 1 is a cross-sectional view schematically showing an optical fiber according to the first embodiment.

FIG. 1 shows schematic configuration of an optical fiber 10 according to a first embodiment of the present invention.

The optical fiber 10 includes a core 1 disposed on the center portion, and a cladding 4 disposed on the outer circumference side (the outer circumference) of the core 1 to be concentric with the core 1.

The cladding 4 includes an inner cladding layer 2 adjacent to the outer circumference side (the outer circumference) of the core 1, and an outer cladding layer 3 formed on the outer circumference side (the outer circumference) of the inner cladding layer 2.

Figure 2A:
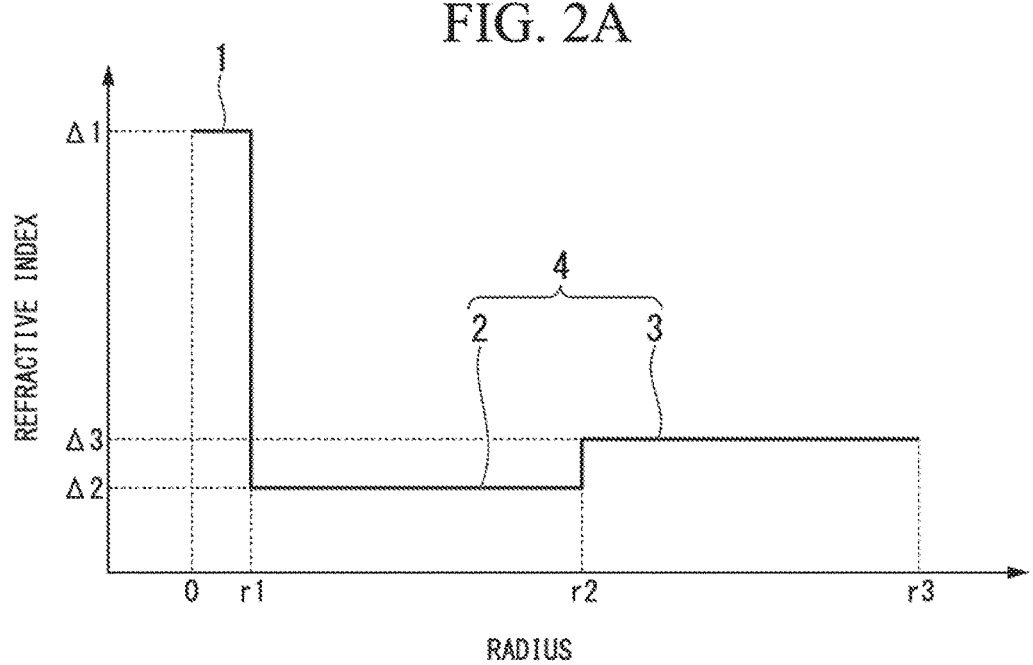
FIG. 2A is a drawing schematically showing a refractive index profile of the optical fiber shown in FIG. 1.

FIG. 2A schematically shows a refractive index profile of the optical fiber 10.

The refractive index of the core 1 is defined as $\Delta 1$, and the maximum refractive index of the core 1 is defined as $\Delta 1\max$.

The refractive index of the inner cladding layer 2 is defined as $\Delta 2$, and the minimum refractive index of the inner cladding layer 2 is defined as $\Delta 2\min$.

The refractive index of the outer cladding layer 3 is defined as $\Delta 3$.

The maximum refractive index $\Delta 1\max$ of the core 1 is the refractive index of the core 1 which is maximized in a diameter direction range from the center of the core 1 to the outer circumference of the core 1. In the refractive index profile shown in FIG. 2A, the refractive index $\Delta 1$ of the core 1 is constant without depending on the position in the diameter direction, and thus, the refractive index $\Delta 1$ is identical to the maximum refractive index $\Delta 1\max$ in the entire range.

The minimum refractive index $\Delta 2\min$ of the inner cladding layer 2 is the refractive index of the inner cladding laser 2 which is minimized in a diameter direction range from the inner circumference of the inner cladding laser 2 to the outer circumference of the inner cladding layer 2. In the refractive index profile shown in FIG. 2A, the refractive index $\Delta 2$ of the inner cladding layer 2 is constant without depending on the position in the diameter direction, and thus, the refractive index $\Delta 2$ is identical to the minimum refractive index $\Delta 2\min$ in the entire range.

In the optical fiber 10, Expression (1) described below is established.

$$\Delta 1\max > \Delta 2\min \text{ and } \Delta 1\max > \Delta 3 \tag{1}$$

As shown in Expression (1), the maximum refractive index $\Delta 1\max$ of the core 1 is greater than the minimum refractive index $\Delta 2\min$ of the inner cladding layer 2 and the refractive index $\Delta 3$ of the outer cladding layer 3.

In addition, in the optical fiber 10, the minimum refractive index $\Delta 2\min$ of the inner cladding layer 2 is less than the refractive index $\Delta 3$ of the outer cladding layer 3.

In the optical fiber 10, Expression (2) described below is further established.

$$0.01\% < |\Delta 2\min - \Delta 3| < 0.03\% \tag{2}$$

Expression (2) indicates that the absolute value of a difference between the minimum refractive index $\Delta 2\min$ of the inner cladding layer 2 and the refractive index $\Delta 3$ of the outer cladding layer 3 is greater than 0.01% and less than 0.03%.

When the absolute value of the difference between $\Delta 2\min$ and $\Delta 3$ is excessively small, the bending loss may not be sufficiently reduced. In contrast, when the absolute value of the difference between $\Delta 2\min$ and $\Delta 3$ is excessively large, the mode field diameter decreases, and a connection loss at the time of being connected to the other optical fiber (for example, a general single mode optical fiber (SSMF)) may increase.

In the optical fiber 10, it is possible to reduce the bending loss by setting the absolute value of the difference between $\Delta 2\min$ and $\Delta 3$ to be greater than 0.01%. In addition, it is possible to optimize the mode field diameter (MFD) and to suppress the connection loss to be Sow at the time of being connected to the other optical fiber by setting the absolute value of the difference between $\Delta 2\min$ and $\Delta 3$ to be less than 0.03%.

In the optical fiber 10 of the first embodiment. Expression (1A) described below is established with respect to a magnitude relationship of $\Delta 1\max$, $\Delta 2\min$, and $\Delta 3$.

$$\Delta 1\max > \Delta 3 > \Delta 2\min \tag{1A}$$

As shown in Expression (1A), the maximum refractive index $\Delta 1\max$ of the core 1 is greater than the refractive index $\Delta 3$ of the outer cladding layer 3.

The refractive index $\Delta 3$ of the outer cladding layer 3 is greater than the minimum refractive index $\Delta 2\min$ of the inner cladding layer 2.

$\Delta 3$ is greater than $\Delta 2\min$, and thus Expression (2) described above is able to be described as follows.

$$0.01\% < (\Delta 3 - \Delta 2\min) < 0.03\% \tag{2A}$$

Expression (2A) indicates that a difference between the refractive index $\Delta 3$ of the outer cladding layer 3 and the minimum refractive index $\Delta 2\min$ of the inner cladding layer 2 is greater than 0.01% and less than 0.03%.

The outer circumferential radii of the core 1, the inner cladding layer 2, and the outer cladding layer 3 are respectively defined as r1, r2, and r3.

The outer circumference radius r1 of the core 1, the outer circumferential radius r2 of the inner cladding layer 2, and the outer circumferential radius r3 of the outer cladding layer 3 have a relationship denoted by Expression (3) described below.

$$r1 < r2 < r3 \quad (3)$$

A ratio r1/r2 of the outer circumference radius r1 of the core 1 to the outer circumferential radius r2 of the tuner cladding layer 2 is in a range denoted by Expression (4) described below.

$$0.2 \leq r1/r2 \leq 0.5 \quad (4)$$

When r1/r2 is excessively small, she mode field diameter decreases, the connection loss at the time of being connected to the other optical fiber (for example, SSMF) may increase. In contrast, when r1/r2 is excessively large, the bending loss may increase.

In the optical fiber 10, r1/r2 is adjusted to be greater than or equal to 0.2, and thus, the mode field diameter is able to be optimized, and the connection loss at the time of being connected to the other optical fiber is able to be suppressed to be low. r1/r2 is adjusted to be less than or equal to 0.5, and thus, the bending loss is able to be reduced.

In the optical, fiber 10, a cable cut-off wavelength $\lambda cc$ (i.e., a cut-off wavelength $\lambda c_{22m}$ of 22 m) is adjusted to be less than or equal to 1260 nm. That is, Expression (5) described below is established.

$$\lambda cc \leq 1260 \text{ nm} \quad (5)$$

Accordingly, the regulation of ITU-T Recommendation G.652 is able to be satisfied.

The cut-off wavelength $\lambda cc$, for example, is able to be measured by a measurement method disclosed in ITU-T Recommendation G.650.

In the optical fiber 10, the refractive index and the outer circumferential radius described above are adjusted, and thus, the mode field diameter (MFD) at a wavelength of 1310 nm is greater than or equal 8.6 μm and less than or equal to 9.5 μm. That is, Expression (6) described below is established.

$$8.6 \text{ μm} \leq MFD \leq 9.5 \text{ μm} \quad (6)$$

The mode field diameter is in the range of Expression (6), and thus, the connection loss at the time of being connected to the other optical fiber (for example, S-SMF) is able to be suppressed to be low.

In the optical fiber 10, the mode field diameter is in the range of Expression (6), and thus, the regulation of ITU-T G.652 is satisfied.

In the optical fiber 10, it is preferable that a loss increase at a wavelength of 1550 nm at the time of winding the optical fiber 10 around a cylindrical mandrel having a diameter of 15 mm 10 times be less than or equal to 0.25 dB.

In addition, it is preferable that the loss increase at a wavelength of 1.625 nm at the time of winding the optical fiber 10 around the cylindrical mandrel having a diameter of 15 mm 10 times be less than or equal to 1.0 dB.

The core 1, for example, is able to be configured of silica glass of which the refractive index increases by adding a dopant such as germanium (Ge).

The inner cladding layer 2, for example, is able to be configured of silica glass of which the refractive index decreases by adding a dopant such as fluorine (F). The inner cladding layer 2, for example, may be configured of silica glass of which the refractive index increases by adding a dopant such as chlorine (Cl).

The outer cladding layer 3, for example, is able to be configured of pure silica glass. In the outer cladding layer 3, the refractive index may be adjusted by adding a dopant (for example, Ge, F, and the like).

Each layer configuring the optical fiber 10 is able to be formed by a known method such as a modified chemical vapor deposition method, a plasma chemical vapor deposition method, a vapor-phase axial deposition method, and an outside vapor deposition method, or a combination thereof.

For example, in a case where the modified chemical vapor deposition method is adopted, the optical fiber preform is able to be prepared as follows.

A glass deposition layer which becomes the inner cladding layer 2 is formed on the inside of a silica glass tube (for example, a glass tube formed of pure silica glass) which becomes the outer cladding layer 3, for example, by using a raw material containing a dopant such as fluorine (F). The refractive index of the inner cladding layer 2 is able to be adjusted by the added amount of the dopant.

Next, a glass deposition layer which becomes the core 1 is formed on the inside of the glass deposition layer described above, for example, by using a raw material containing a dopant such as germanium (Ge). Furthermore, the core 1 is able to be formed by using a core rod which is separately prepared.

The silica glass tube in which the glass deposition layer is formed becomes the optical fiber preform through a transparency step, a solidification step, and the like. The optical fiber preform is subjected to fiber drawing, and thus, the optical, fiber 10 shown in FIG. 1 is able to be obtained.

The chemical vapor deposition method is preferable front the viewpoint of accurately adjusting the refractive index profile by adding a dopant.

The vapor-phase axial deposition method and the outside vapor deposition method are also able to be applied to manufacture the optical fiber 10. The vapor-phase axial deposition method and the outside vapor deposition method have advantages such as high productivity.

In the optical fiber 10, a difference in the refractive indices between the inner cladding layer 2 and the outer cladding layer 3 is in the range described above (refer to Expression (2)), and a ratio of the outer circumferential radius of the core 1 and the outer circumferential radius of the inner cladding layer 2 in the range described above (refer to Expression (4)), and thus, the connection loss at the time of being connected to the other optical fiber is able to be suppressed to be low, and the bending loss is able to be reduced.

It has been known that the refractive index of the cladding in a portion close to the core considerably affects optical properties of the optical fiber, but as a result of intensive studies of the present inventor, a refractive index profile has been found in which the bending loss is able to be reduced without decreasing the mode field diameter.

By adopting the refractive index profile, the optical fiber 10 has technical meaning from the viewpoint of making suppression of the connection loss at the time of being connected to the other optical fiber and a reduction in the bending loss compatible.

In the optical fiber 10, the difference in the refractive indices between the inner cladding layer 2 and the outer cladding layer 3 is small, and thus, the refractive index of the inner cladding layer 2 and the outer cladding layer 3 is able to be easily and accurately adjusted by using the manufacturing method of the related art (for example, a general manufacturing method of S-SMF) without considerably changing the method.

In addition, the difference in the refractive indices between the inner cladding layer 2 and the outer cladding layer 3 is small, and thus, constraint based on the manufacturing method decreases. For example, not only the chemical vapor deposition method which is considered to be suitable for adjusting the refractive index profile but also the vapor-phase axial deposition method and the outside vapor deposition method are able to be adopted.

Accordingly, the optical fiber 10 is able to be easily manufactured, and manufacturing costs are able to be made low.

In the optical fiber 10, the difference in the refractive indices between the inner cladding layer 2 and the outer cladding layer 3 is small, and thus, the added amount of the dopant such as fluorine (F) and chlorine (Cl) for forming fee inner cladding layer 2 is able to be reduced.

Raw material gas (for example, $SiF_4$) used in a dope such as fluorine (F) is expensive, and thus, raw material costs are able to be suppressed and manufacturing costs are able to be made low by reducing the amount of the dopant added.

As shown in FIG. 2A, in the optical fiber 10, the minimum refractive index $\Delta 2min$ of the inner cladding layer 2 is less than the refractive index $\Delta 3$ of the outer cladding layer 3, and thus it is possible to make containment of the light with respect to the core 1 excellent and to reduce the bending loss.

More specifically, when $\Delta 2$ is small, it is preferable in terms of for example, costs other than the characteristics. Generally, in order to form a low refractive region, it is necessary to add a dopant such as fluorine (F) described above which reduces the refractive index, and material costs increases. However, in the present application, since the adding amount of the fluorine is remarkably small, the cost reduction can be expected. In addition, when $\Delta 2$ is small, it is preferable in terms of a transmission loss. The dopant added to the inner cladding layer 2 diffuses into the core portion under a high temperature environment such as the sintering process and the drawing process of a preform of the optical fiber. Since the Raleigh scattering coefficient which is a dominant factor of the transmission loss increases with the increase of the content of the dopant, the transmission loss decreases when the fluorine diffuses into the core portion. However, in the present application, since the adding amount of the fluorine is remarkably small, it is not necessary to consider influence on the transmission loss.

Here, the results of the simulation regarding the refractive index difference of the inner cladding layer 2 shown in FIG. 1 are shown. Table 1 shows calculation results of characteristics when each parameter shown in FIG. 2A is set.

TABLE 1

| Parameter | Example 1 | 2 | 3 | 4 | 5 | 6 | 7 |
|---|---|---|---|---|---|---|---|
| Δ1 [%] | 0.37 | 0.36 | 0.35 | 0.33 | 0.36 | 0.38 | 0.34 |
| Δ2 [%] | −0.03 | −0.03 | −0.03 | −0.03 | −0.02 | −0.02 | −0.02 |
| Δ3 [%] | 0.00 | 0.00 | 0.00 | 0.00 | 0.00 | 0.00 | 0.00 |
| r1/r2 | 0.20 | 0.40 | 0.50 | 0.20 | 0.40 | 0.20 | 0.40 |
| r2 [μm] | 43.0 | 22.5 | 18.0 | 47.0 | 22.0 | 43.0 | 23.0 |
| MFD at 1.31 μm [μm] | 8.74 | 8.98 | 9.06 | 9.35 | 8.96 | 8.74 | 9.27 |
| cable cut-off wavelength λcc [nm] | 1221 | 1234 | 1235 | 1255 | 1238 | 1245 | 1260 |
| Bending loss (R = 15 mm) at 1.55 μm [dB/10 turn] | 0.008 | 0.009 | 0.032 | 0.006 | 0.023 | 0.003 | 0.062 |
| Bending loss (R = 15 mm) at 1.625 μm [dB/10 turn] | 0.084 | 0.069 | 0.328 | 0.047 | 0.23 | 0.024 | 0.661 |
| Dispersion at 1.31 μm [ps/km/nm] | 0.348 | 0.747 | 0.577 | 0.074 | 0.411 | 0.317 | 0.744 |

| Parameter | Example 8 | 9 | 10 | 11 | 12 | 13 | 14 |
|---|---|---|---|---|---|---|---|
| Δ1 [%] | 0.37 | 0.34 | 0.39 | 0.33 | 0.36 | 0.33 | 0.40 |
| Δ2 [%] | −0.01 | −0.01 | −0.01 | −0.01 | −0.04 | −0.04 | −0.04 |
| Δ3 [%] | 0.00 | 0.00 | 0.00 | 0.00 | 0.00 | 0.00 | 0.00 |
| r1/r2 | 0.40 | 0.20 | 0.25 | 0.29 | 0.20 | 0.33 | 0.25 |
| r2 [μm] | 21.5 | 43.5 | 32.0 | 32.0 | 45.0 | 28.5 | 35.0 |
| MFD at 1.31 μm [μm] | 8.88 | 9.14 | 8.59 | 9.40 | 8.98 | 9.34 | 8.57 |
| cable cut-off wavelength λcc [nm] | 1252 | 1202 | 1252 | 1255 | 1238 | 1227 | 1260 |
| Bending loss (R = 15 mm) at 1.55 μm [dB/10 turn] | 0.011 | 0.20 | 0.005 | 0.25 | 0.012 | 0.082 | 0.001 |
| Bending loss (R = 15 mm) at 1.625 μm [dB/10 turn] | 0.087 | 0.94 | 0.036 | 0.930 | 0.145 | 0.82 | 0.005 |
| Dispersion at 1.31 μm [ps/km/nm] | 0.128 | 0.055 | −0.223 | 0.532 | 0.809 | 1.193 | 0.830 |

Based on the calculation results described above, if $\Delta 1$, r2, and r1/r2 are set appropriately when $\Delta 2$ has a range of −0.01% to −0.04%, an optical fiber which comply with G.657.A can be realized (i.e., MFD at the wavelength of 1310 nm is 8.6-9.5 μm), the cable cut-off wavelength λcc is less than or equal to 1260 nm, a loss increase (bending loss) at a wavelength of 1550 (1625) nm at the time of winding the optical fiber around a mandrel having a diameter of 15 mm 10 times be less than or equal to 0.25 (1.0) dB). In other words, when $\Delta 2$ has a range of −0.01% to −0.04%, it is found that both of the MFD and the bending loss can be increased.

Figure 2B:
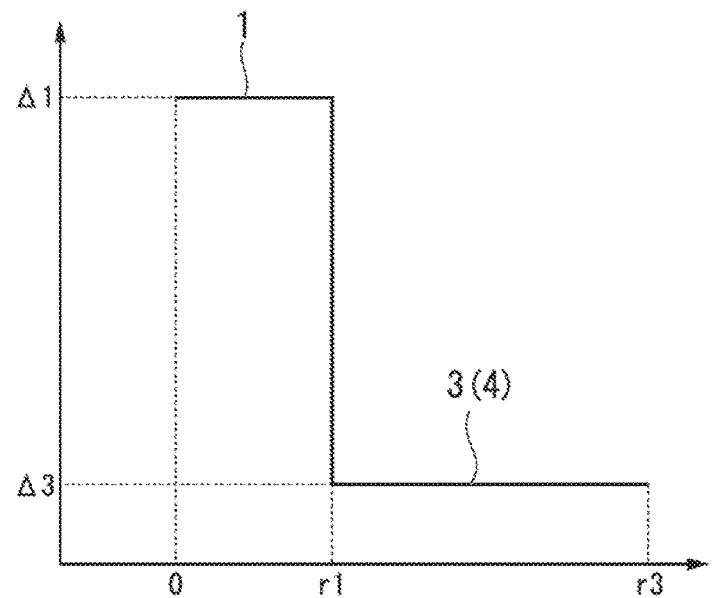
FIG. 2B is a drawing schematically showing a refractive index profile of an optical fiber of Comparative Example.

As a comparative example, results of the case where the inner cladding layer does not present are shown. Table 2 shows calculation results of the characteristics when each parameter of the refractive index profile where the inner cladding layer shown in FIG. 2B is not present is set.

TABLE 2

| Parameter | Comparative Example | | |
|---|---|---|---|
| | 1 | 2 | 3 |
| Δ1 [%] | 0.37 | 0.36 | 0.34 |
| r1 [μm] | 4.17 | 4.25 | 4.40 |
| MFD at 1.31 μm [μm] | 8.82 | 8.98 | 9.27 |
| λcc [nm] | 1256 | 1261 | 1263 |
| Bending loss (R = 15 mm) at 1.55 μm [dB/10 turn] | 0.185 | 0.131 | 0.469 |
| Bending loss (R = 15 mm) at 1.625 μm [dB/10 turn] | 1.226 | 1.944 | 5.947 |
| Dispersion at 1.31 μm [ps/km/nm] | −0.341 | −0.178 | 0.084 |

In the comparative example, despite an upper limit of die cable cut-off wavelength of 1260 nm and the bending-loss-enhanced refractive index, the bending loss does not satisfy the standard of G.657.A1. Also based on the results of the comparative example, it is also found that an optical fiber with high performance can be realized by providing the inner cladding-portion within an appropriate refractive index range.

Second Embodiment

Figure 3:
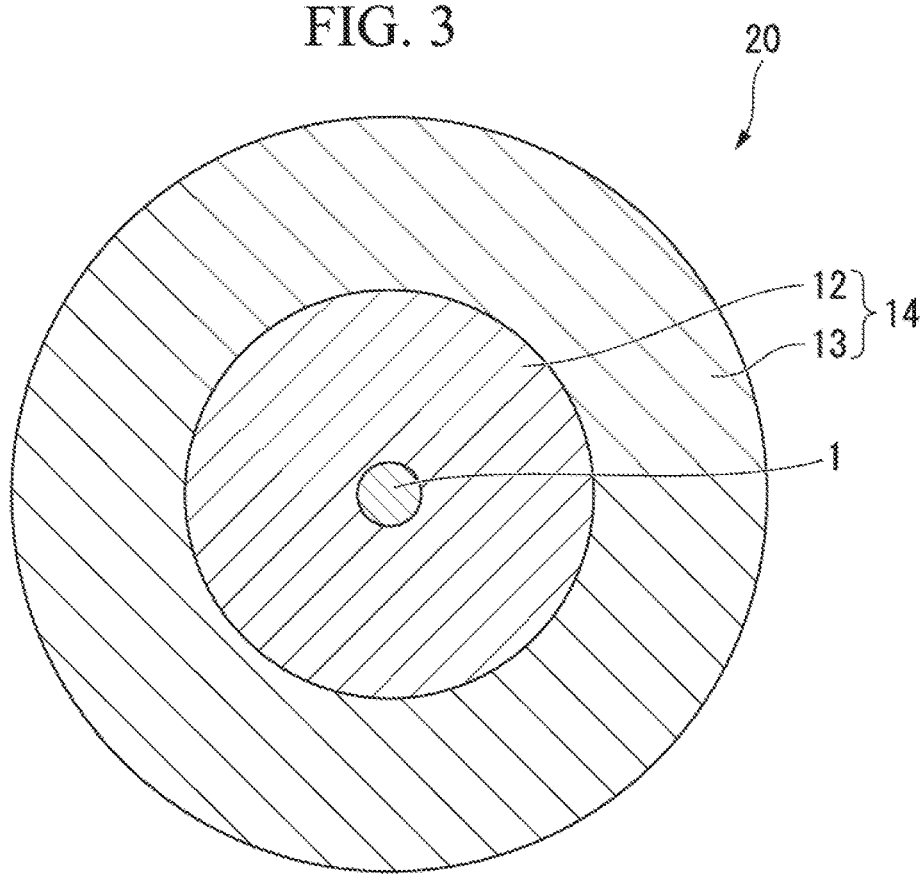
FIG. 3 is a cross-sectional view schematically showing an optical fiber according to the second embodiment.
Figure 4:
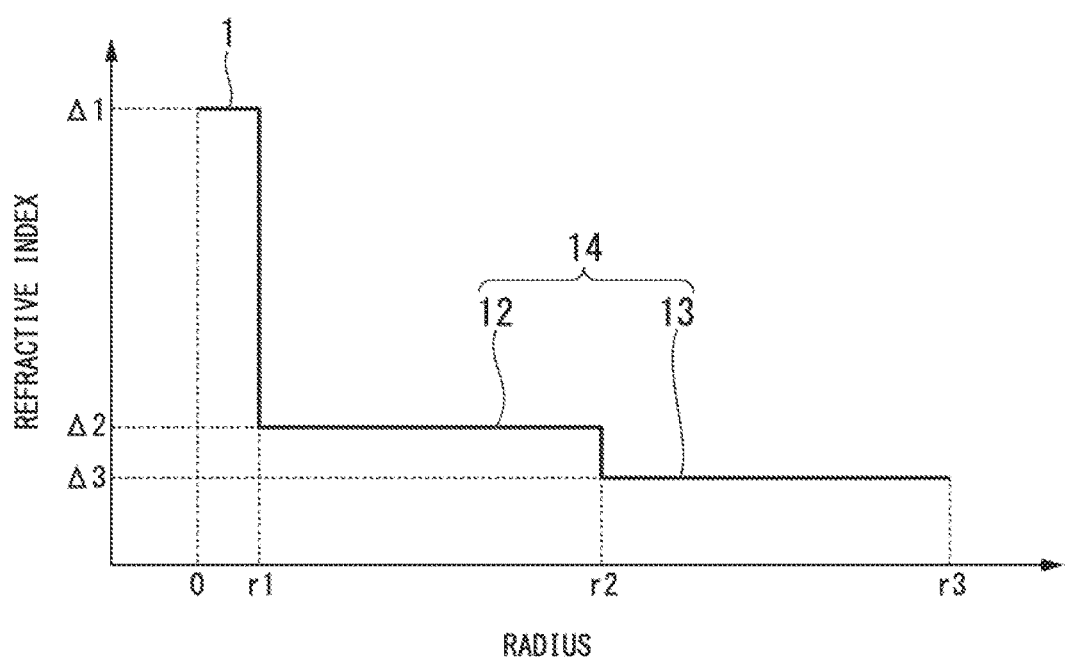
FIG. 4 is a drawing schematically showing a refractive index profile of the optical fiber shown in FIG. 3.

FIG. 3 shows a schematic configuration of an optical fiber 20 according to a third embodiment of the present invention.

The optical fiber 20 includes the core 1 disposed on the center portion, and a cladding 14 disposed on the outer circumference side (the outer circumference) of the core 1 to be concentric with the core 1.

The cladding 14 includes the inner cladding layer 12 adjacent to the outer circumference side (the outer circumference) of the core 1, and the outer cladding layer 13 formed on the outer circumference side (the outer circumference) of the inner cladding layer 12.

FIG. 14 schematically shows a refractive index profile of the optical fiber 20,

The refractive index of the core 1 is defined as Δ1, and the maximum refractive index of the core 1 is defined as Δ1max. The refractive index of the inner cladding layer 12 is defined as Δ2, and the minimum refractive index of the inner cladding layer 12 is defined as Δ2min. The refractive index of the outer cladding layer 13 is defined as Δ3.

In the optical fiber 20, Expression (7) described below is established as with the optical fiber 10 of the first embodiment.

$$\Delta 1max > \Delta 2min \text{ and } \Delta 1max > \Delta 3 \quad (7)$$

The optical fiber 20 is different from the optical fiber 10 of the first embodiment in that the minimum refractive index Δ2min of the inner cladding layer 12 is adjusted to be greater than the refractive index Δ3 of the outer cladding layer 13.

In the optical fiber 20, Expression (8) described below is established as with the optical fiber 10 of the first embodiment.

$$0.01\% < |\Delta 2min - \Delta 3| < 0.03\% \quad (8)$$

The absolute value of the difference between the Δ2min and Δ3 is adjusted to be in the range of Expression (8) described above, and thus, the mode field diameter (MFD) is able to be optimized, the connection loss at the time of being connected to the other optical fiber is able to be suppressed to be low, and the bending loss is able to be reduced.

The outer circumference radius r1 of the core 1, the outer circumferential radius r2 of the inner cladding layer 12, and the outer circumferential radius r3 of the outer cladding layer 13 have relationships denoted by Expressions (9) and (10) described below, as with the optical fiber 10 of the first embodiment.

$$r1 < r2 < r3 \quad (9)$$

$$0.2 \leq r1/r2 \leq 0.5 \quad (10)$$

r1/r2 is adjusted to be greater than or equal to 0.2, and thus the mode field diameter is able to be optimized, the connection loss at the time of being connected to the other optical fiber is able to be suppressed to be low, and the bending loss is able to be reduced.

In the optical fiber 20, a cable cut-off wavelength λcc (i.e., a cut-off wave length $\lambda c_{22m}$ of 22 m) is adjusted to be less than or equal to 1260 nm, as with the optical fiber 10 of the first embodiment.

In addition, the mode field diameter (MFD) at a wavelength of 1310 nm is greater than or equal to 8.6 μm and less than or equal to 9.5 μm.

In the optical fiber 20, it is preferable that the loss increase at a wavelength of 1550 nm at the time of winding the optical fiber 20 around a cylindrical mandrel having a diameter of 15 mm 10 times be less than or equal to 0.25 dB. In addition, it is preferable that the loss increase at a wavelength of 1625 nm at the time of winding the optical fiber 20 around the cylindrical mandrel having a diameter of 15 mm 10 times be less than or equal to 1.0 dB.

The core 1, for example, is able to be configured of silica glass of which the refractive, index increases by adding a dopant such as germanium (Ge).

The inner cladding layer 2, for example, is able to be configured of pure silica glass, in the inner cladding layer 2, for example, the refractive index may be adjusted by adding a dopant such as chlorine (Cl).

The outer cladding layer 3, for example, is able to be configured of pure silica glass. The outer cladding layer 3, for example, may be configured of silica glass of which the refractive index decreases by adding a dopant such as fluorine (F).

The optical fiber 20 is able to be manufactured by a modified chemical vapor deposition method, a plasma chemical vapor deposition method, a vapor-phase axial deposition method, an outside vapor deposition method, and the like, as with the optical fiber 10 of the first embodiment.

For example, in a case where the modified chemical vapor deposition method is adopted, the optical fiber preform is able to be prepared as follows.

A glass deposition layer which becomes the inner cladding layer 2 is formed on the inside of a silica glass tube (for example, a silica, glass tube containing a dopant such as fluorine (F)) which becomes the outer cladding layer 3 by using a raw material such as pure silica glass.

Next, a glass deposition layer which becomes the core 1 is formed on the inside of the glass deposition layer, for example, by using a raw material, containing a dopant such as germanium (Ge). Furthermore, the core 1 is able to be formed by using a core rod which is separately prepared.

The silica glass tube in which the glass deposition, layer is formed, becomes the optical fiber preform through a transparency step, a solidification step, and the like. The optical fiber preform is subjected to fiber drawing, and thus, the optical fiber 20 shown in FIG. 3 is able to be obtained.

In the optical fiber 20, a difference in the refractive indices between the inner cladding layer 12 and the outer cladding layer 13 is in the range described above, and a ratio of the outer circumferential radius of the core 1 and the outer circumferential radius of the inner cladding layer 12 is in the range described above, and thus, the connection loss at the time of being connected to the other optical fiber is able to be suppressed to be low, and the bending loss is able to be reduced.

In the optical fiber 20, the manufacturing method of the related art is able to be used without being considerably changed, and thus, the optical fiber 20 is able to be easily manufactured, and the manufacturing costs are able to be made low.

As described above, the preferred embodiments of the present invention have been described, but the second embodiment and the third embodiment are examples of the present invention, and addition, omission, substitution, and other changes are able to be performed without departing from the range of the present invention.

For example, in the optical fibers 10 and 20 shown in FIG. 1 and FIG. 3, the clads 4 and 14 are formed of two cladding layers (the inner cladding layer and the outer cladding layer), and the cladding may include layers other than the inner cladding layer and the outer cladding layer.

Third Embodiment

Figure 5:
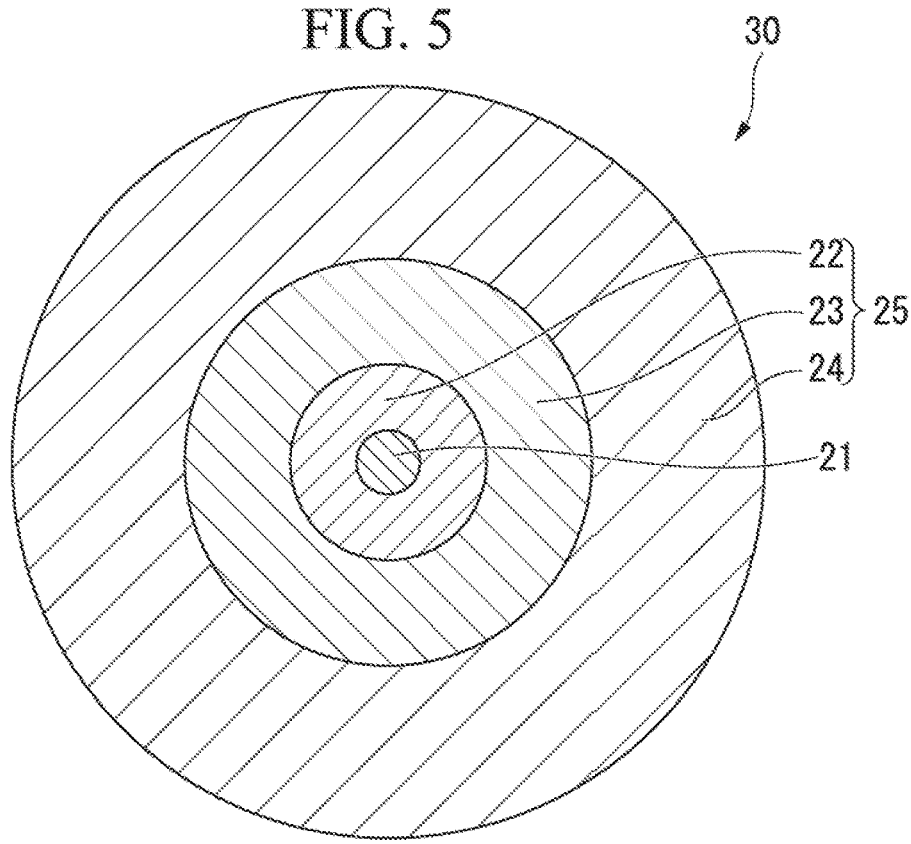
FIG. 5 is a cross-sectional view schematically showing an optical fiber according to the third embodiment.

FIG. 5 shows a schematic configuration of an optical fiber 30 according to a third embodiment of the present invention.

The optical fiber 30 includes a core 21 disposed on the center portion, and a cladding 25 disposed on the outer circumference side (the outer circumference) of the core 21 to be concentric with the core 21.

The cladding 25 includes an inner cladding portion 22 adjacent to the outer circumference side (the outer circumference) of the core 21, a trench 23 formed to be adjacent to the outer circumference side (the outer circumference) of the inner cladding portion 22, and an outer cladding portion 24 formed on the outer circumference side (the outer circumference) of the trench 23.

Figure 6:
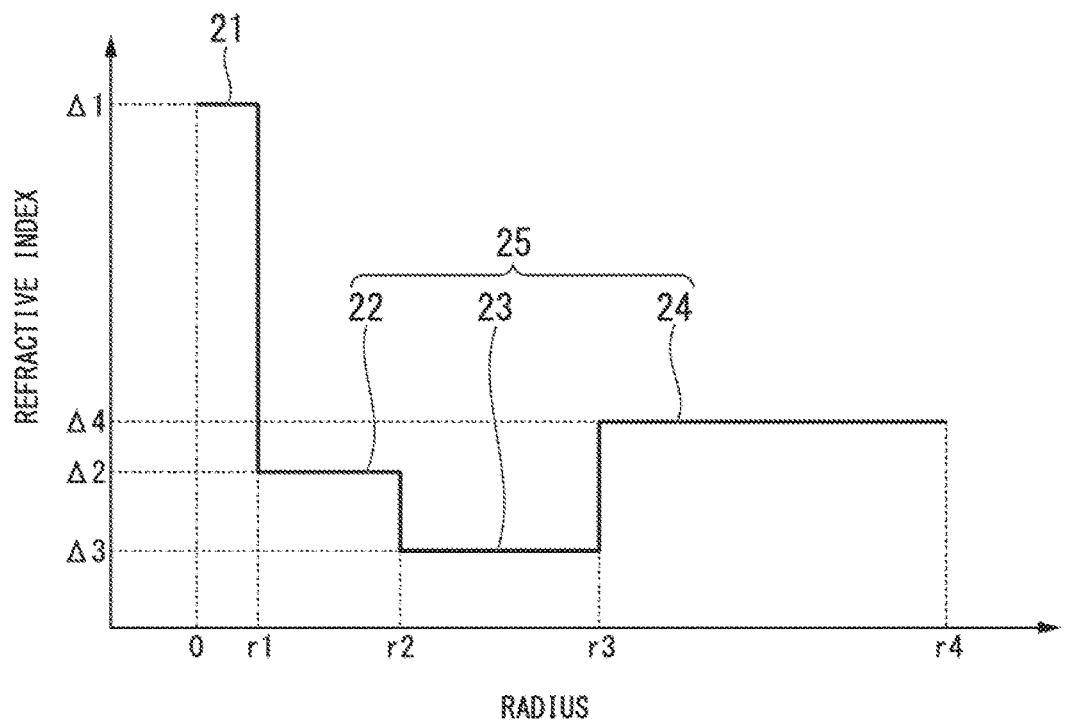
FIG. 6 is a drawing schematically showing a refractive index profile of the optical fiber shown in FIG. 5.

FIG. 6 schematically shows a refractive hides profile of the optical fiber 30.

The refractive index of the core 21 is defined as $\Delta 1$, and the maximum refractive index of the core 21 is defined as $\Delta 1\text{max}$.

The refractive index of the inner cladding portion 22 is defined as $\Delta 2$, and the minimum refractive index of the inner cladding portion 22 is defined as $\Delta 2\text{min}$.

The refractive index of the trench 23 is defined as $\Delta 3$, and the minimum refractive index of the trench 23 is defined as $\Delta 3\text{min}$.

The refractive index of the outer cladding portion 24 is defined as $\Delta 4$.

The maximum refractive index $\Delta 1\text{max}$ of the core 21 is the refractive index of the core 21 which is maximized in a diameter direction range from the center of the core 21 to the outer circumference of the core 21. In the refractive index profile shown in FIG. 6, the refractive index $\Delta 1$ of the core 21 is constant without depending on the position of the diameter direction, and thus, the refractive index $\Delta 1$ is identical to the maximum refractive index $\Delta 1\text{max}$ in the entire range.

The minimum refractive index $\Delta 2\text{min}$ of the inner cladding portion 22 is the refractive index of the inner cladding portion 22 which is minimized in a diameter direction range from the inner circumference of the inner cladding portion 22 to the outer circumference of the inner cladding portion 22. In the refractive index profile shown in FIG. 6, the refractive index $\Delta 2$ of the inner cladding portion 22 is constant without depending on the position of the diameter direction, and thus, the refractive index $\Delta 2$ is identical to the minimum refractive index $\Delta 2\text{min}$ in the entire range.

The minimum refractive index $\Delta 3\text{min}$ of the trench 23 is the refractive index of the trench 23 which is minimized in a diameter direction range from the inner circumference of the trench 23 to the outer circumference of the trench 23. In the refractive index profile shown in FIG. 6, the refractive index $\Delta 3$ of the trench 23 is constant without depending on the position of the diameter direction, and thus, the refractive index $\Delta 3$ is identical to the minimum refractive index $\Delta 3\text{min}$ in the entire range.

In the optical fiber 30, Expression (11) described below is established.

$$\Delta 1\text{max} > \Delta 2 > \Delta 3\text{min} \tag{11}$$

As shown in Expression (11), the maximum refractive index $\Delta 1\text{max}$ of the core 21 is greater than the refractive index $\Delta 2$ of the inner cladding portion 22.

The refractive index $\Delta 2$ of the inner cladding layer 22 is greater than $\Delta 3\text{min}$ of the trench 23.

In the optical fiber 30, Expression (12) described below is further established.

$$\Delta 1\text{max} > \Delta 4 > \Delta 3\text{min} \tag{12}$$

As shown, in Expression (12), the maximum refractive index $\Delta 1\text{max}$ of the core 21 is greater than the refractive index $\Delta 4$ of the outer cladding portion 24.

The refractive index $\Delta 4$ of the outer cladding portion 24 is greater than $\Delta 3\text{min}$ of the trench 23.

In the optical fiber 30, Expression (13) described below is further established.

$$0.01\% < (\Delta 4 - \Delta 3\text{min}) < 0.03\% \tag{13}$$

Expression (13) indicates dial a difference between the refractive index $\Delta 4$ of the outer cladding portion 24 and the minimum refractive index $\Delta 3\text{min}$ of the trench 23 is greater than 0.01% and less than 0.03%.

When the difference between $\Delta 4$ and $\Delta 3\text{min}$ is excessively small, the bending loss may not be sufficiently reduced. In contrast, the difference between $\Delta 4$ and $\Delta 3\text{min}$ is excessively large, the mode field diameter decreases, and the connection loss at the time of being connected to the other optical fiber (for example, a general single mode optical fiber (S-SMF)) may increase.

In the optical fiber 30, the difference between $\Delta 4$ and $\Delta 3\text{min}$ is in a range of greater than 0.01%, and thus, the bending loss is able so be reduced. In addition, the difference between $\Delta 4$ and $\Delta 3\text{min}$ is less than 0.03%, and thus, the mode field diameter (MFD) is able to be optimized, and the connection loss at the time of being connected to the other optical fiber is able to be suppressed to be low.

The outer circumferential radii of the core 21, the inner cladding portion 22, the trench 23, and the outer cladding portion 24 are respectively r1, r2, r3, and r4.

The outer circumference radius r1 of the core 21, the outer circumferential radius r2 of the inner cladding layer 22, the outer circumferential radius r3 of the trench 23, and the outer circumferential radius r4 of the outer cladding layer 24 have a relationship denoted by Expression (14) described below.

$$r1 \le r2 < r3 < r4 \tag{14}$$

A ratio r2/r1 of the outer circumferential radios r2 of the inner cladding layer 22 to the outer circumference radius r1 of the core 21 is in a range denoted by Expression (15) described below.

$$1 \le r2/r1 \le 5 \tag{15}$$

When r2/r1 is excessively small, the bending loss may increase. In contrast, when r2/r1 is excessively large, the mode field diameter decreases, and the connection loss at the time of being connected to the other optical fiber (for example, SSMF) may increase.

In the optical fiber 30, r2/r1 is greater than or equal to 1, and thus, it is possible to reduce the bending loss. r2/r1 is less than or equal to 5, the mode field diameter is able to be optimized, and the connection loss at the time of being connected to the other optical fiber is able to be suppressed to be low.

A ratio r3/r2 of the outer circumferential radius r3 of the trench 23 to the outer circumferential radius r2 of the inner cladding layer 22 is in a range denoted by Expression (16) described below.

$$1 < r3/r2 \leq 2 \qquad (16)$$

When r3/r2 is excessively small, the bending loss may increase. In contrast, when r3/r2 is excessively large, the mode field diameter decreases, and the connection loss at the time of being connected to the other optical fiber (for example, SSMF) may increase.

In the optical fiber 30, r3/r2 is greater than 1, and thus, it is possible to reduce the bending loss. r3/r2 is less than or equal to 2, and thus, the mode field diameter is able to be optimized, and the connection loss at the time of being connected to the other optical fiber is able to be suppressed to be low.

In the optical fiber 30, the cut-off wavelength λcc is less than or equal to 1260 nm.

That is, Expression (17) described below is established.

$$\lambda cc \leq 1260 \text{ nm} \qquad (17)$$

Accordingly, the regulation of ITU-T Recommendation G.652 is able to be satisfied.

The cut-off wavelength λcc, for example, is able to be measured by a measurement method disclosed in ITU-T Recommendation G.650.

In the optical fiber 30, the refractive index and the outer circumferential radius described above are adjusted, and thus the mode field diameter (MFD) at a wavelength of 1310 nm is greater than or equal to 8.6 µm and less than or equal to 9.5 µm. That is. Expression (18) described below is established.

$$8.6 \text{ µm} \leq MFD \leq 9.5 \text{ µm} \qquad (18)$$

The mode field diameter is in the range of Expression (18), and thus, the connection loss at the time of being connected to the other optical fiber (for example, SSMF) is able to be suppressed to be low.

In the optical fiber 30, the mode field diameter is in the range of Expression (18), and thus, the regulation of ITU-T G.652 is satisfied.

In the optical fiber 30, it is preferable that the loss increase at a wavelength of 1550 nm at the time of winding, the optical fiber 30 around a cylindrical mandrel having a diameter of 15 mm 10 times be less than, or equal to 0.25 dB.

In addition, it is preferable that the loss increase at a wavelength of 1625 nm at the time of winding the optical fiber 30 around the cylindrical mandrel having a diameter of 15 mm 10 times be less than or equal to 1.0 dB.

The core 21, for example, is able to be configured of silica glass of which the refractive index increases by adding a dopant such as germanium (Ge).

The inner cladding layer 22 and the trench 23, for example, are able to be configured of silica glass of which the refractive index decreases by adding a dopant such as fluorine (F).

The outer cladding layer 24, for example, is able to be configured of pure silica glass. In the outer cladding layer 24, the refractive index may be adjusted by adding a dopant (for example, Ge, F, and the like).

Each layer configuring the optical fiber 30 is able to be formed by a known method such as a modified chemical vapor deposition method, a plasma chemical vapor deposition method, a vapor-phase axial deposition method, and an outside vapor deposition method, or a combination thereof.

For example, in a case where the modified chemical vapor deposition method is adopted, the optical fiber preform is able to be prepared as follows.

A glass deposition layer which becomes the trench 23 is formed on the inside of the silica glass tube (for example, a glass tube formed of pare silica glass) which becomes the outer cladding layer 24, for example, by using a raw material containing a dopant such as fluorine (F).

A glass deposition layer which becomes the inner cladding layer 22 is formed on the inside of the glass deposition layer, for example, by using a raw material containing a dopant such as fluorine (F).

The refractive index of the trench 23 and the inner cladding layer 22 is able to be adjusted by the added amount of the dopant.

Next, a glass deposition layer which becomes the core 21 is formed on the inside of the glass deposition layer, for example, by using a raw material containing a dopant such as germanium (Ge). Furthermore, the core 21 is able to be formed by using a core rod which is separately prepared.

The silica glass tube in which the glass deposition layer is formed becomes the optical fiber preform through a transparency step, a solidification step, and the like. The optical fiber preform is subjected to fiber drawing, and thus, the optical fiber 30 shown in FIG. 5 is able to be obtained.

The chemical vapor deposition method is preferable from the viewpoint of accurately adjusting the refractive index profile by adding a dopant.

The vapor-phase axial deposition method and the outside vapor deposition method are also able to be applied to manufacture the optical fiber 30. The vapor-phase axial deposition method and the outside vapor deposition method have advantages such as high productivity.

In the optical fiber 30 a difference in the refractive indices between the trench 23 and the outer cladding layer 24 is in the range described above (refer to Expression (13), and a ratio of the outer circumferential radius of the core 21, the outer circumferential radius of the inner cladding layer 22, and the outer circumferential radius of the trench 23 is in the range described above (refer to Expressions (15) to (17)), and thus, the connection loss at the time of being connected to the other optical fiber is able to be suppressed to be low, and the bending loss is able to be reduced.

It has been known that the refractive index of the cladding in a portion close to the core considerably affects optical properties of the optical fiber, but as a result of intensive studies of the present inventor, a refractive index profile has been found in which the bending loss is able to be reduced without decreasing the mode field diameter.

By adopting the refractive index profile, the optical fiber 30 has technical meaning from the viewpoint of making suppression of the connection loss at the time of being connected to the other optical fiber and a reduction in the bending loss compatible.

In the optical fiber 30, the difference in the refractive indices between the trench 23 and the outer cladding layer 24 is small, and thus, the refractive index of the trench 23 and the outer cladding layer 24 is able to be easily and accurately adjusted by using the manufacturing method of the related art (for example, a general manufacturing method of SSMF) without considerably changing the method.

In addition, the difference in the refractive indices between the trench 23 and the outer cladding layer 24 is small, and thus, constraint based on the manufacturing method decreases. For example, not only the chemical vapor deposition method which is considered to be suitable for adjusting the refractive index profile, but also the vapor-phase axial deposition method, and the outside vapor deposition method are able to be adopted.

Accordingly, the optical fiber 30 is able to be easily manufactured, and manufacturing costs are able to be made low.

In the optical fiber 30, the difference in the refractive indices between the trench 23 and the outer cladding layer 24 is small, and thus, the added amount of the dopant such as fluorine (F) for forming the trench 23 is able to be reduced.

Raw material gas (for example, $SiF_4$) used in a dope such as fluorine (F) is expensive, and thus, raw material costs are able to be suppressed and manufacturing costs are able to be made low by reducing the added amount of the dopant.

As described above, the outer circumference radii r1 to r4 of the core 21, the inner cladding layer 22, the trench 23, and the outer cladding layer 24 have a relationship denoted by Expression (14).

$$r1 \leq r2 < r3 < r4 \tag{14}$$

In the optical fiber 30 shown in FIG. 5 and FIG. 6, r1, r2, and r3 are values different from each other, but the present invention includes a case of r1=r2 and r2≠r3.

Figure 7:
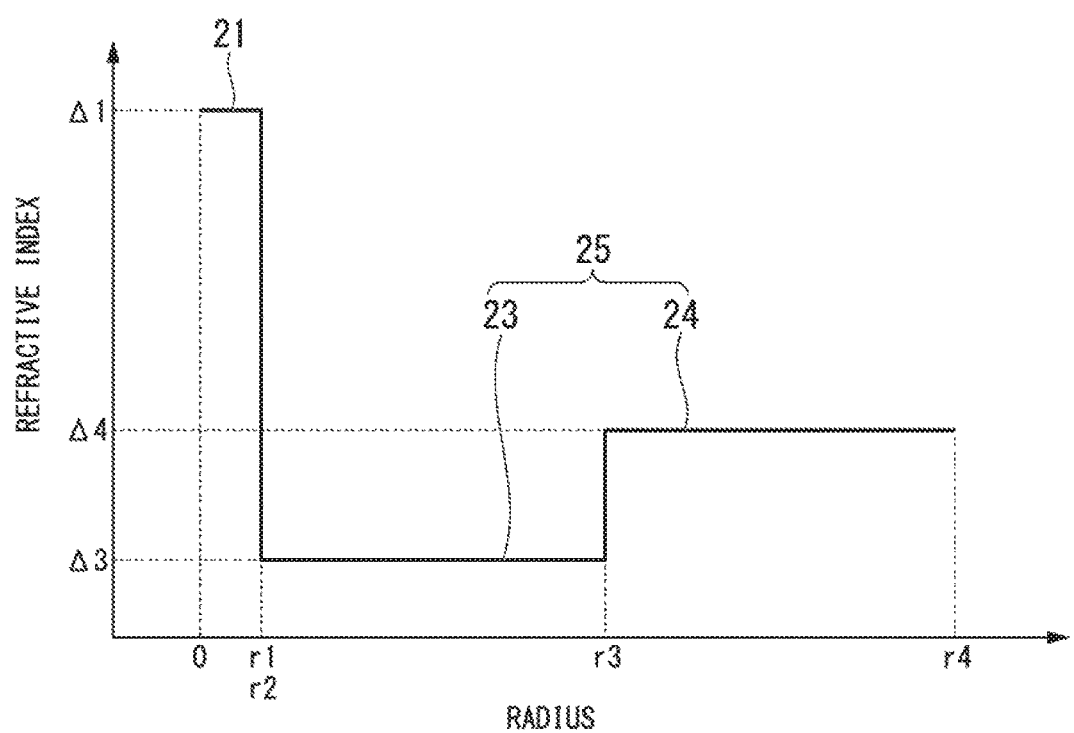
FIG. 7 is a drawing schematically showing a refractive index profile of the optical fiber according to another embodiment.

FIG. 7 is a diagram of a refractive index profile of an optical fiber of a fifth embodiment of the present invention, and shows a case of r1=r2 and r2≠r3.

In the optical fiber, r1 is identical to r2, and thus the cladding 25 is formed only of the trench 23 and the outer cladding layer 24 formed on the outer circumference side of the trench 23.

As described above, the fourth embodiment and the fifth embodiment of the present invention have been described, but the fourth embodiment and the fifth embodiment are examples of the present invention, and addition, omission, substitution, and other changes are able to be performed without departing from the range of the present invention.

For example, in the optical fiber 30 shown in FIG. 5, the cladding 25 is formed of three lasers (the inner cladding layer, the trench, and the outer cladding layer), but the cladding may include other layers.

What is claimed is:

1. An optical fiber comprising a core and a cladding formed on an outer periphery of the core, wherein:
   the cladding comprises at least an inner cladding layer adjacent to the core and an outer cladding layer formed on the outer circumference side of the inner cladding layer;
   a refractive index of the core is $\Delta 1$ and a maximum refractive index of the core is $\Delta 1 max$;
   a refractive index of the inner cladding layer is $\Delta 2$ and a minimum refractive index of the inner cladding layer is $\Delta 2 min$;
   a refractive index of the outer cladding layer is $\Delta 3$;
   the refractive index of the core, the refractive index of the inner cladding layer, and the refractive index of the outer cladding layer have a relationship denoted by Expressions (1) and (2);

$$\Delta 1 max > \Delta 2 min \text{ and } \Delta 1 max > \Delta 3 \tag{1}$$

$$0.01\% < |\Delta 2 min - \Delta 3| < 0.03\% \tag{2}$$

an outer circumference radius r1 of the core, an outer circumferential radius r2 of the inner cladding layer, and an outer circumferential radius r3 of the outer cladding layer have a relationship denoted by Expressions (3) and (4);

$$r1 < r2 < r3 \tag{3}$$

$$0.2 \leq r1/r2 \leq 0.5 \tag{4}$$

a cable cut-off wavelength $\lambda cc$ satisfies Expression (5); and $$\lambda cc \leq 1260 \text{ nm} \tag{5}$$

a mode field diameter at a wavelength of 1310 nm satisfies Expression (6)

$$8.6 \text{ }\mu m \leq MFD \leq 9.5 \text{ }\mu m \tag{6}$$

2. The optical fiber according to claim 1, wherein the refractive index of the core, the refractive index of the inner cladding layer, and the refractive index of the outer cladding layer have a relationship denoted by Expressions (1A) and (2A)

$$\Delta 1 max > \Delta 3 > \Delta 2 min \tag{1A}$$

$$0.01\% < (\Delta 3 - \Delta 2 min) < 0.03\% \tag{2A}$$

3. The optical fiber according to claim 2, wherein $\Delta 1 max$ further satisfies $0.33\% \leq \Delta 1 max \leq 0.40\%$.

4. The optical fiber according to claim 1, wherein:
   a loss increase at a wavelength of 1550 nm at the time of winding the optical fiber around a mandrel having a diameter of 15 mm 10 times is less than or equal to 0.25 dB; and
   a loss increase at a wavelength of 1625 nm at the time of winding the optical fiber around the mandrel having the diameter of 15 mm 10 times be less than or equal to 1.0 dB.

5. The optical fiber according to claim 1, wherein the outer cladding layer is formed of pure silica glass; and the inner cladding layer is formed of silica glass to which fluorine is added.

6. The optical fiber according to claim 1, wherein: the outer cladding layer is formed of pure silica glass; and the inner cladding layer is formed of silica glass to which chlorine is added.

7. An optical fiber comprising a core and a cladding formed on an outer periphery of the core, wherein:
   the cladding comprises at least an inner cladding layer adjacent to the core, a trench portion adjacent to the outer circumference side of the inner cladding layer, and an outer cladding layer formed on the outer circumference side of the trench portion;
   a refractive index of the core is $\Delta 1$ and a maximum refractive index of the core is $\Delta 1 max$;
   a refractive index of the inner cladding layer is $\Delta 2$ and a minimum refractive index of the inner cladding layer is $\Delta 2 min$;
   a refractive index of the trench portion is $\Delta 3$ and a minimum refractive index of the inner cladding layer is $\Delta 3 min$;

a refractive index of the outer cladding layer is $\Delta 4$;

the refractive index of the core, the refractive index of the inner cladding layer, the refractive index of the trench portion, and the refractive index of the outer cladding layer have a relationship denoted by Expressions (11)-(13);

$$\Delta 1max > \Delta 2 > \Delta 3min \qquad (11)$$

$$\Delta 1max > \Delta 4 > \Delta 3min \qquad (12)$$

$$0.01\% < (\Delta 4 - \Delta 3min) < 0.03\% \qquad (13)$$

an outer circumference radius r1 of the core, an outer circumferential radius r2 of the inner cladding layer, an outer circumferential radius r3 of the trench portion, and an outer circumferential radius r4 of the outer cladding layer have a relationship denoted by Expressions (14)-(16);

$$r1 \leq r2 < r3 < r4 \qquad (14)$$

$$1 \leq r2/r1 \leq 5 \qquad (15)$$

$$1 < r3/r2 \leq 2 \qquad (16)$$

a cable cut-off wavelength $\lambda cc$ satisfies Expression (17); and $$\lambda cc \leq 1260 \text{ nm} \qquad (17)$$

a mode field diameter at a wavelength of 1310 nm satisfies Expression (18)

$$8.6 \text{ }\mu m \leq MFD \leq 9.5 \text{ }\mu m \qquad (18).$$

8. The optical fiber according to claim 7, wherein:

a loss increase at a wavelength of 1550 nm at the time of winding the optical fiber around a mandrel having a diameter 15 mm 10 times is less than or equal to 0.25 dB; and a loss increase at a wavelength of 1625 nm at the time of winding the optical fiber around the mandrel having the diameter of 15 mm 10 times be less than or equal to 1.0 dB.

9. The optical fiber according to claim 7, wherein:

the outer cladding layer is formed of pure silica glass; and the trench portion is formed of silica glass to which fluorine is added.

* * * * *